United States Patent
Reiser

[19]

[11] Patent Number: 5,853,909

[45] Date of Patent: Dec. 29, 1998

[54] ION EXCHANGE MEMBRANE FUEL CELL POWER PLANT WITH WATER MANAGEMENT PRESSURE DIFFERENTIALS

[75] Inventor: Carl Reiser, Glastonbury, Conn.

[73] Assignee: International Fuel Cells, LLC, S. Windsor, Conn.

[21] Appl. No.: 956,120

[22] Filed: Oct. 22, 1997

Related U.S. Application Data

[63] Continuation of Ser. No. 494,132, Jun. 23, 1995, Pat. No. 5,700,595.

[51] Int. Cl.$^6$ .............................. H01M 8/04; H01M 8/10
[52] U.S. Cl. ................................ 429/13; 429/25; 429/26; 429/33
[58] Field of Search ................................ 429/13, 25, 26, 429/33

[56] References Cited

U.S. PATENT DOCUMENTS

| | | | |
|---|---|---|---|
| 3,172,784 | 3/1965 | Blackmer | 429/26 X |
| 5,200,278 | 4/1993 | Watkins et al. | 429/26 X |
| 5,260,143 | 11/1993 | Voss et al. | 429/33 X |
| 5,366,818 | 11/1994 | Wilkinson et al. | 429/33 X |
| 5,372,896 | 12/1994 | Binder et al. | 429/33 |
| 5,441,821 | 8/1995 | Merritt et al. | 429/25 X |
| 5,503,944 | 4/1996 | Meyer et al. | 429/26 X |

*Primary Examiner*—Stephen Kalafut
*Attorney, Agent, or Firm*—William W. Jones

[57] ABSTRACT

A proton exchange membrane fuel cell device with an internal water management and transfer system includes a plurality of adjacently arranged proton exchange membrane assemblies including a proton exchange membrane component; a pair of porous anode and cathode catalyst layers situated on either side of the proton exchange membrane; and porous plate assemblies interposed between and in contact with each of the adjacent proton exchange membrane assemblies. Oxidant gas is supplied to oxidant gas supply channels, and fuel gas to fuel gas supply channels formed in the porous plate assemblies for distribution to the cathode and anode catalyst layers, respectively. A water coolant circulating system is formed in each of the porous plate assemblies and causes each of the porous plate assemblies to become saturated with coolant water. The reactant flow fields are pressurized to a pressure which exceeds the coolant water circulating pressure by a selected ΔP so as to ensure that product water formed on the cathode side of each membrane assembly will be pumped through the porous plates into the coolant water flow field and become entrained in the circulating coolant water stream.

6 Claims, 3 Drawing Sheets

ION EXCHANGE MEMBRANE FUEL CELL POWER PLANT WITH WATER MANAGEMENT PRESSURE DIFFERENTIALS

This is a continuation of application Ser. No. 08/494,132, filed Jun. 23, 1995 now U.S. Pat. No. 5,700,595.

TECHNICAL FIELD

The present invention relates to ion exchange electrolyte membrane fuel cell power plants and more particularly to a water management system therefor.

BACKGROUND ART

Fuel cell power plants employing ion-exchange electrolyte membranes confined between respective porous cathode and anode electrode reactant flow field plates are known in the art. Operation of such power plants with hydrogen as the fuel reactant and oxygen or air as the oxidant reactant results in the production of product water at the cathode side of each cell in the power plant. Furthermore, as hydrogen ions travel through the membrane, they drag water through the membrane from the anode side to the cathode side. This results in two problems that must be addressed. The first problem is dryout of anode side of the membrane, and the second problem is flooding of the cathode side of the membrane. Either of these problems, if not solved, can result in malfunction of the power plant.

One solution to both of the aforesaid problems is disclosed in Austrian Patent No. 389,020 which describes an ion-exchange membrane fuel cell stack that utilizes a fine pore water coolant plate assemblage to provide passive cooling and water management control in the cells in a power plant. The Austrian system utilizes a water-saturated fine pore plate assemblage between the cathode side of one cell and the anode side of the adjacent cell to both cool the cells and to prevent reactant cross-over between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two-parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniform in thickness and pore size.

It would be desirable to provide a water management system for use in an ion exchange membrane fuel cell power plant that can operate efficiently with fine pore water wicking plates, such as are disclosed in the aforesaid Austrian patent, but which plates are all essentially uniform in thickness and pore size.

DISCLOSURE OF THE INVENTION

This invention relates to an ion exchange membrane fuel cell power plant having an internal coolant and product water management system. Each of the cells in the power plant includes an ion exchange membrane electrolyte component. Fine pore plate assemblies are interposed between, and in contact with, adjacent membrane components. Each fine pore plate assembly contacts the anode catalyst layer on one of the adjacent membrane components, and contacts the cathode catalyst layer on the next adjacent membrane component. The fine pore plate assemblies include a plurality of oxidant gas supply channels opening onto the cathode catalyst layers, and a plurality of fuel gas supply channels opening onto the anode catalyst layers. The fine pore plate assemblies also include internal coolant water circulating channels which provide separate coolant water flow fields between adjacent cells in the power plant. Coolant water from the coolant water flow fields is wicked into the fine pore plates by capillarity so as to completely fill the fine pore plates with water thereby preventing cell-to-cell oxidant/fuel gas crossover between adjacent cells in the power plant, and also providing coolant water on both sides of each of the electrolyte membranes.

The oxidant reactant gas is pressurized to a pressure which exceeds the coolant loop pressure by a predetermined $\Delta P$. Thus the oxidant reactant (cathode) flow fields will be maintained at a pressure which exceeds the pressure in the coolant water flow fields. The resultant $\Delta P$ will cause product water appearing on the cathode side of each membrane to be pumped through the fine pore plates into the coolant water flow field. The desired pressure differential can be maintained with a system of valves and regulators which may be manually or automatically operated. The fuel reactant (anode) flow field pressure will be maintained at a level which allows coolant water migration from the coolant loop through the fine pore plates toward the membrane, but which prevents flooding of the anode surface of the membranes with coolant water. Thus, product water will be removed from the cathode side of each membrane, and coolant water will be delivered to the anode side of each membrane. The water management system of this invention depends on positive pressure differentials being established and maintained between the cathode oxidant reactant flow fields and the water coolant flow fields, and therefore allows uniform fine pore plates to be used in power plants which are constructed in accordance with this invention.

It is therefore an object of this invention to provide a proton exchange membrane fuel cell assembly having a water flow management system that does not require the use of structurally differentiated fine pore plate components.

It is a further object of this invention to provide a fuel cell assembly of the character described which ensures the removal of product water from the cathode side of each cell in the power plant.

It is yet another object of this invention to provide a fuel cell assembly of the character described which utilizes a higher fluid pressure in the oxidant reactant gas flow field and a lower fluid pressure in the water coolant flow field in order to establish an internal pressure differential that pumps product water from the cathode side of each cell in the power plant.

These and other objects and advantages of the invention will become more readily apparent from the following

BEST MODE FOR CARRYING OUT THE INVENTION

Figure 1:
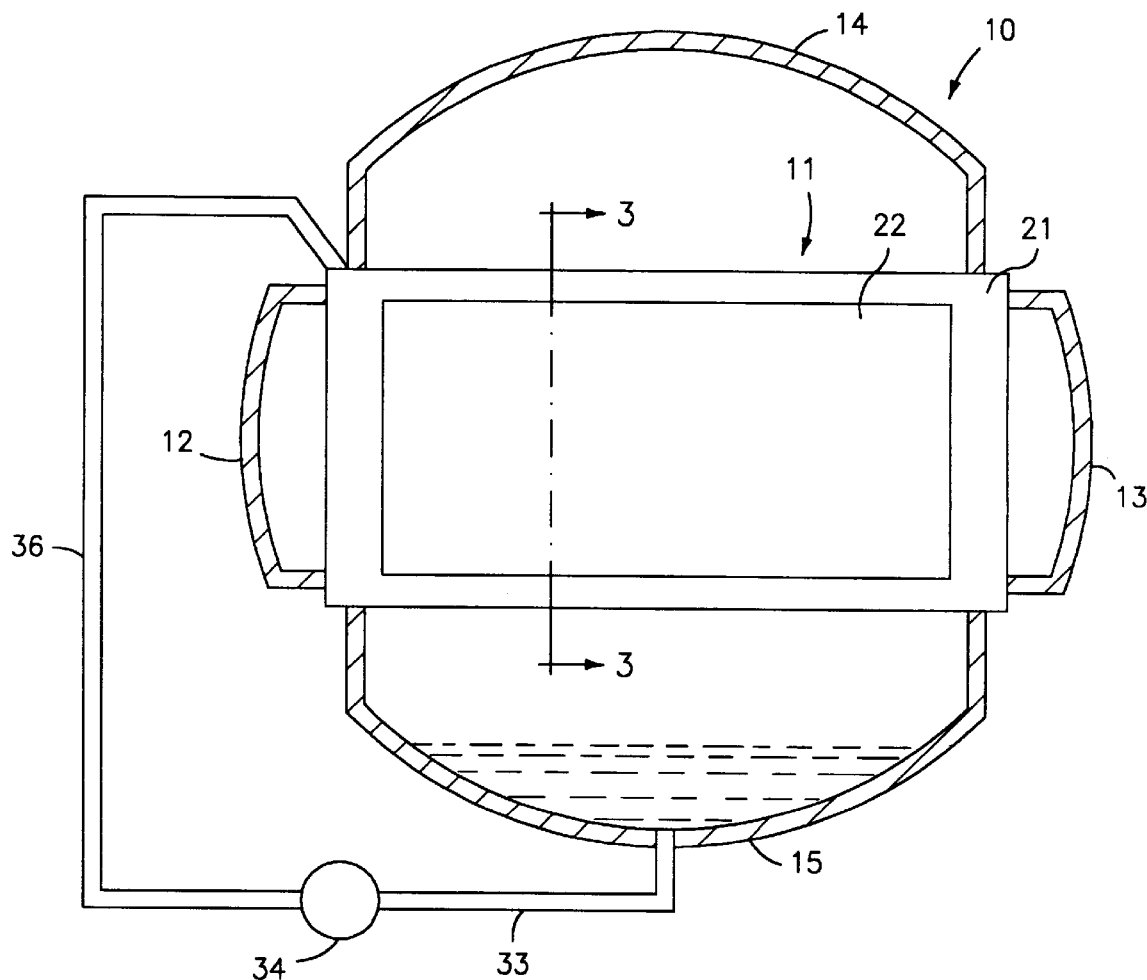
FIG. 1 is a somewhat schematic cross sectional view of a proton exchange membrane fuel cell power plant formed in accordance with this invention.
Figure 2:
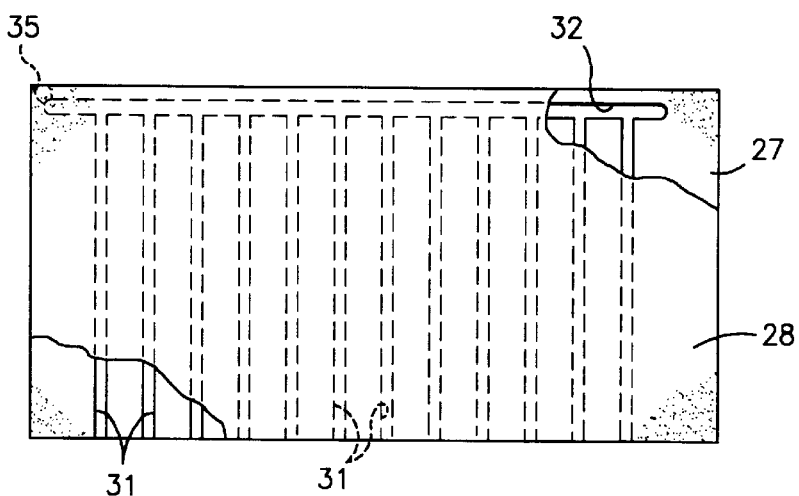
FIG. 2 is a front elevational view, partially broken away, of one of the fine pore plate water coolant separator plate assemblies formed in accordance with this invention.

Referring now to FIGS. 1 and 2, there is shown a fuel cell power plant which is designated generally by the numeral 10. The power plant 10 includes a plurality of ion exchange membrane fuel cell assemblies 11, an oxidant reactant gas inlet manifold 12, an oxidant gas outlet manifold 13, a fuel gas inlet manifold 14, and an a fuel gas outlet manifold 15. In the power plant orientation shown in the drawings, the fuel outlet manifold 15 serves as a sump for collecting coolant and product water from the fuel cells 11. A cathode catalyst layer 22 is disposed on one surface of the ion exchange membrane 21.

Coolant water flow fields are formed in juxtaposed fine pore plates 27 and 28 which are interposed between adjacent cells in the power plant. Coolant water is supplied to the cells through main distribution channels 32 and thence through a multitude of coolant channels 31 which are formed in the plates 27 and 28. Coolant water is withdrawn from the water sump via a conduit 33 by a pump 34 and is directed into a conduit 36 which leads to a water inlet port 35 that communicates with the main distribution channel 32. As coolant water flows through the channels 31, it penetrates and fills the pores of the plates 27 and 28 so as to prevent reactant gas cross-over between adjacent cells in the power plant.

Figure 3:
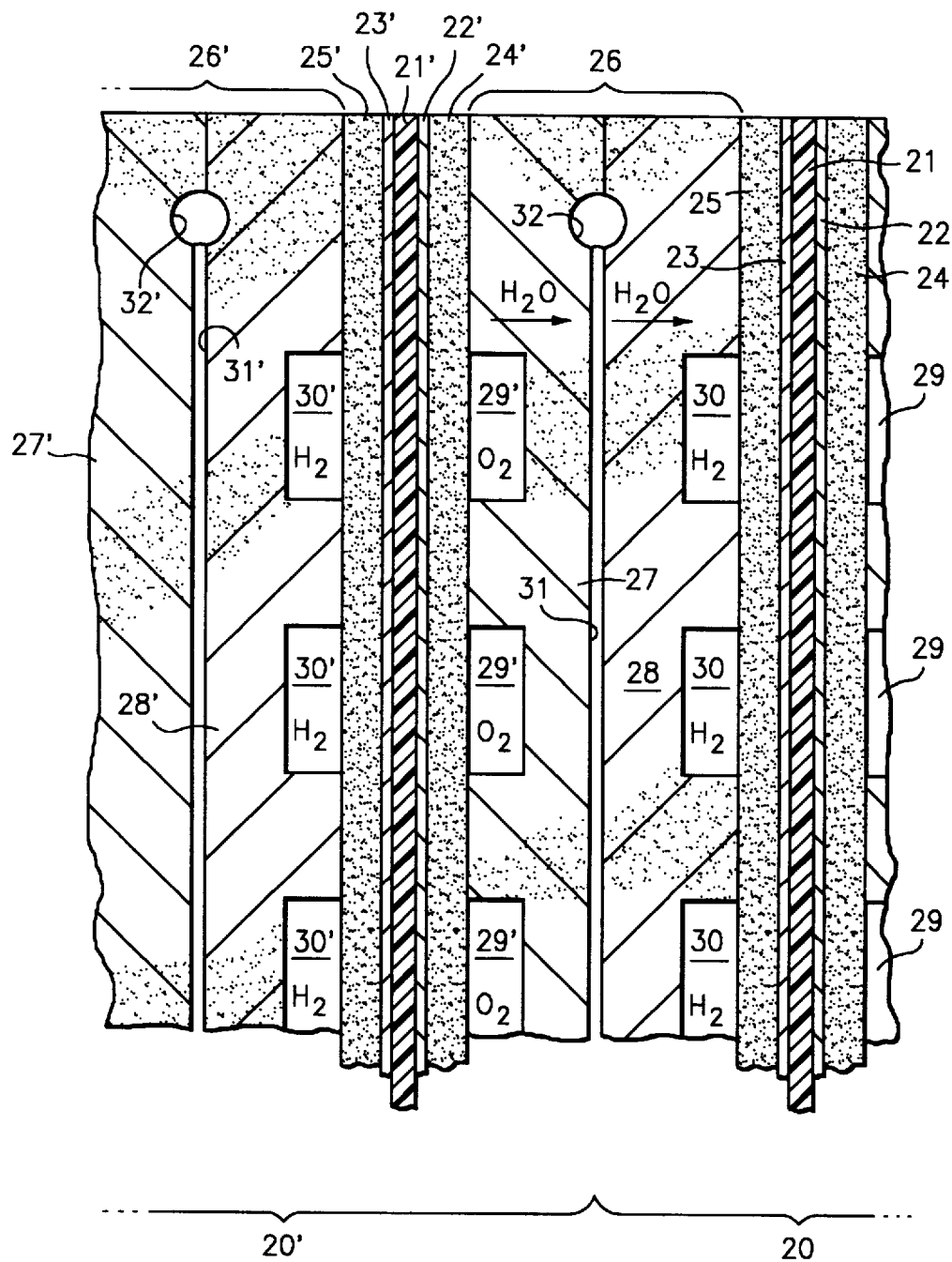
FIG. 3 is a sectional view taken along line 3—3 of FIG. 1.

Referring now to FIG. 3, further details of the assemblies 11 are shown. FIG. 3 shows portions of two adjacent fuel cells 20 and 20' of the assembly 11. It will be noted that, in addition to the cathode catalyst layers 22, 22', the membranes 21, 21' of the fuel cells 20, 20' are provided with a anode catalyst layers 23, 23'. Porous hydrophilic plate assemblies 26 and 26' are situated between adjacent cells 20, 20' in the power plant. The plate assemblies 26, 26' are formed from separate plates 27, 27' and 28, 28' that are substantially identical in composition, pore size, and structure. The plate assemblies 26, 26' provide oxidant and fuel gas channels 29, 29', and 30, 30', respectively. Coolant water is distributed to coolant channels 31, 31' via distribution channels 32, 32'.

Figure 4:
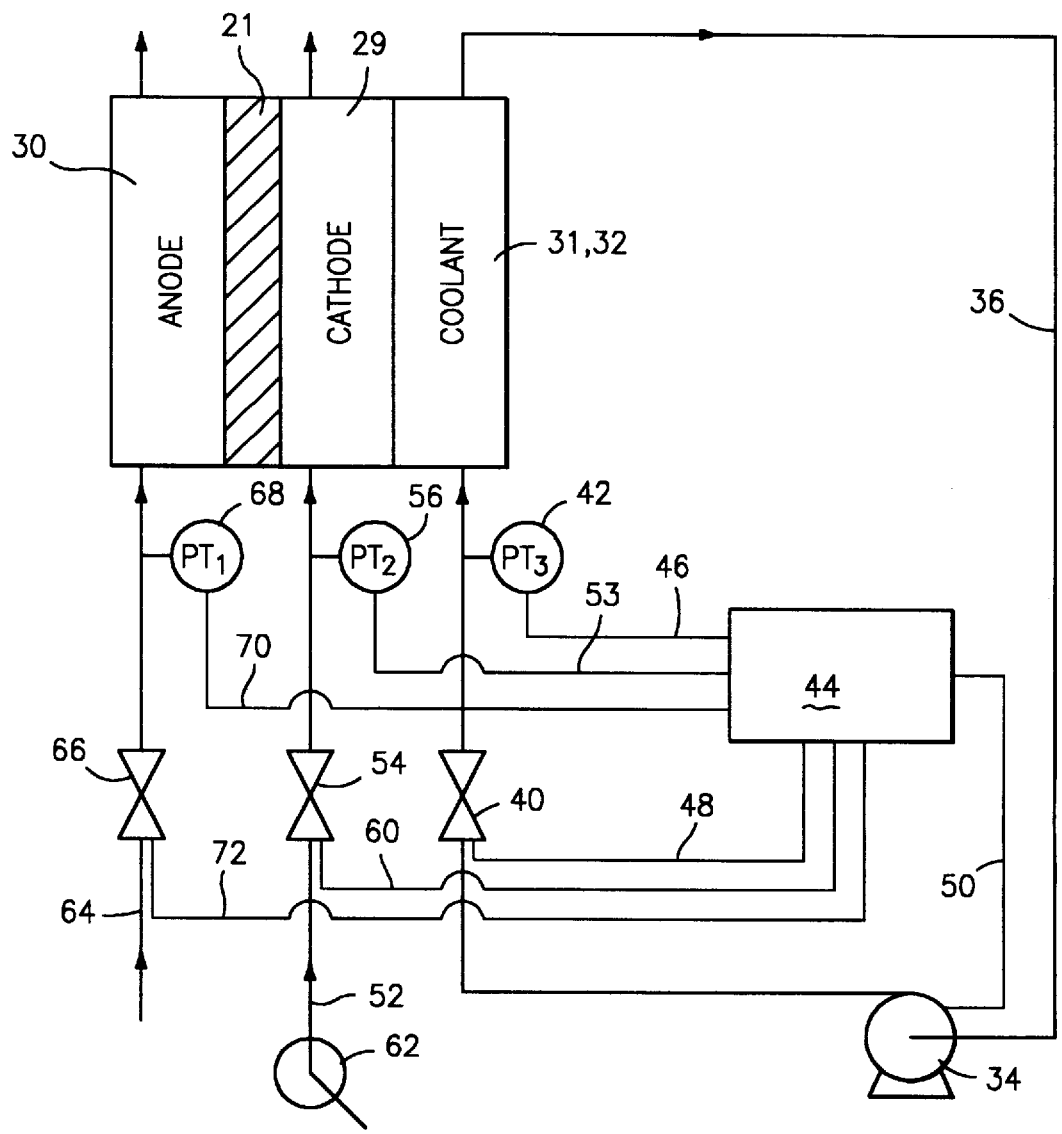
FIG. 4 is a schematic view of an operating system employed in the power plant which will provide the necessary pressure differential between the oxidant reactant flow field and the water coolant flow field.

Referring now to FIG. 4, there is shown schematically a coolant and reactant pressure control system which can be used to ensure that fuel and oxidant reactant pressures are properly maintained relative to the coolant water system pressure so as to ensure proper cooling and water management in accordance with the system and method of this invention. In FIG. 4, the cell membrane is denoted by the numeral 21; the cathode oxidant reactant flow field is denoted by the numeral 29; the anode fuel reactant flow field is denoted by the numeral 30; and the water coolant flow field is denoted by the numerals 31, 32, as in the previous figures. The coolant water circulates through a coolant loop 36 which is pressurized by a pump 34. The pump 34 establishes a predetermined coolant water pressure in the loop 36, which pressure may be further regulated by a variable valve 40 prior to entering the coolant flow field 31, 32. If the pump 34 is a fixed rate pump, the valve 40 will be useful for varying coolant pressure in the event that pressure adjustments are necessary. If a variable speed pump were used, the valve 40 could possible be eliminated from the system. A pressure transducer 42 is disposed downstream of the pump 34 and valve 40, and is operable to measure the pressure of the coolant water stream before it enters the coolant flow field 31, 32. The pressure transducer 42, the valve 40 and the pump 34 may be connected to a power plant microprocessor controller 44 via lines 46, 48 and 50. Coolant pressure input from the pressure transducer 42 will cause the controller 44 to regulate the pump 34 and/or valve 40 when necessary to achieve a target coolant pressure.

The oxidant reactant may be essentially pure oxygen derived from a pressurized oxygen container, or may be air which is pressurized by a compressor or air blower. The oxidant reactant is delivered to the cathode flow field 29 through a line 52. The line 52 may contain a variable pressure regulating valve 54 and a downstream pressure transducer 56 which measures the extant pressure of the oxidant stream as it enters the cathode flow field 31, 32. The pressure transducer 56 is connected to the system controller 44 via line 53 and the variable valve 54 is connected to the controller 44 by line 60. When a variable compressor or pump 62 is used to pressure an air oxidant, appropriate connections may be made with the controller 44. The controller 44 can thus make appropriate corrections in the oxidant reactant pressure when system operating conditions so dictate by varying the valve 54 or the pump/compressor 62.

The fuel reactant is fed into the anode flow field 30 by means of a line 64. The fuel reactant gas will typically be contained in a pressurized container, or in a pressurized fuel conditioning or reforming system (not shown). A variable valve 66 is operable to regulate the pressure of the fuel reactant as it enters the anode flow field 30. The fuel reactant pressure is monitored by a pressure transducer 68 which is connected to the system controller 44 by a line 70. The variable valve 66 is connected to the system controller 44 by a line 72. General system operating conditions will require that the oxidant gas pressure in the cathode flow field 29 exceed the coolant pressure in the coolant flow field 31, 32 by a predetermined $\Delta P$ so as to ensure movement of the product water from the cathode side of the membrane 21 toward the coolant flow field 31, 32. Likewise, the fuel gas reactant pressure in the anode flow field should also exceed the coolant water pressure by a second predetermined $\Delta P$ which will allow appropriate migration of water toward the anode side of the membrane 21 to prevent membrane dryout, but will not allow a degree of water migration that would flood the anode surface of the membrane 21.

The valves, pumps, and the like equipment for producing the desired pressure differentials may be manually operable, or may be automatic devices that can be operated by a system microprocessor controller. The $\Delta P$'s needed to properly operate the power plant may vary depending on power output, plant size, internal pressures of reactants, and the like. Pressure gauges can be used in place of pressure transducers, if desired.

Since many changes and variations of the disclosed embodiment of the invention may be made without departing from the inventive concept, it is not intended to limit the invention otherwise than as required by the appended claims.

What is claimed is:

1. A method for operating a solid polymer electrolyte membrane fuel cell power plant, said method comprising the steps of:
   a) providing oxidant and fuel reactant gas streams on opposite cathode and anode sides of the solid polymer electrolyte membrane;
   b) providing a circulating water coolant stream in communication with said cathode side and anode side of the electrolyte membrane;
   c) providing fine pore plates between said oxidant gas stream and said circulating water coolant stream and between said fuel gas stream and said circulating water coolant stream
   d) setting said oxidant reactant gas stream at a first predetermined pressure;
   e) setting said water coolant stream at a second predetermined pressure which is less than said first predetermined pressure so as to create a positive target pressure differential ($\Delta P$) between said oxidant reactant gas stream and said water coolant stream, which $\Delta P$ is operative to pump water appearing on the cathode side of the electrolyte membrane through one of said fine pore plates and into said circulating water coolant stream; and
   f) setting said fuel gas stream at a predetermined pressure relative to the coolant stream pressure which will allow coolant water to be delivered to or removed from the anode side of the membrane.

2. The method of claim 1 wherein said oxidant reactant gas stream is set at a pressure which is above ambient pressure.

3. The method of claim 1 further comprising the step of continuously or periodically releasing product water from said water coolant stream.

4. A solid polymer electrolyte membrane fuel cell power plant assembly comprising:
   a) oxidant and fuel reactant gas streams on opposite cathode and anode sides of the solid polymer electrolyte membrane;
   b) a circulating water coolant stream in communication with said cathode side and said anode side of the electrolyte membrane;
   c) fine pore plates interposed between said oxidant gas stream and said circulating water coolant stream and between said fuel gas stream and said circulating water coolant stream;
   d) means for setting said oxidant reactant gas stream to a first predetermined pressure;
   e) means for setting said water coolant stream to a second predetermined pressure which is less than said first predetermined pressure so as to create a positive target pressure differential ($\Delta P$) between said oxidant reactant gas stream and said water coolant stream, which $\Delta P$ is operative to pump water appearing on the cathode side of the electrolyte membrane through one of said fine pore plates and into said circulating water coolant stream; and
   f) means for setting said fuel gas stream at a predetermined pressure which will allow coolant water to be delivered to or removed from said anode side of said membrane.

5. The assembly of claim 4 comprising means for setting said oxidant reactant gas stream at a pressure which is above ambient pressure.

6. The assembly of claim 4 further comprising means for continuously or periodically releasing product water from said water coolant stream.

* * * * *